UNITED STATES PATENT OFFICE.

ROBERT PRICE, OF WORCESTER, MASSACHUSETTS.

VARNISH TO PREPARE PHOTOGRAPHIC GROUNDS FOR WOOD-ENGRAVERS.

Specification forming part of Letters Patent No. 17,231, dated May 5, 1857.

*To all whom it may concern:*

Be it known that I, ROBT. PRICE, of Worcester, in the county of Worcester and State of Massachusetts, have invented a new and Improved Method of Producing Photographic Pictures upon the Surface of Wooden Blocks to be Afterward Engraved, of which the following is a full, clear, and exact description.

Efforts have been made to produce photographic pictures upon the surface of engravers' blocks, but thus far the pictures produced, for various reasons, have not proved fit to engrave from. When the pictures have been taken upon a surface prepared by varnishing the block, they have not answered the purpose, as even a thin pellicle upon the surface of the block is sufficient to confuse the engraver and spoil his work. At other times a collodion pellicle, with the picture thereon, has been floated off from a surface of glass upon water and taken up on the wooden block. This, however, was a tedious, uncertain, and unsatisfactory process, and has not been made practically useful.

My invention has for its object to obviate the above inconveniences, and to produce a photographic picture upon a surface of wood that shall entirely answer the requirements of the engraver; and my invention consists in producing a surface upon the block by rubbing into it a volatile varnish made so limpid as easily to soak into and fill the pores of the wood, and produce a smooth and polished surface, without leaving a pellicle thereon of appreciable thickness to obstruct the operations of the engraver.

To enable others skilled in the art to understand my invention and to put the same into practice, I will proceed to describe the manner in which I have carried it out.

The surface of an ordinary engraver's block is smoothed in the customary manner to prepare it for the engraver's use. A mixture is then made of one quart of asphaltum varnish, one gill ether, one-fourth pound lamp-black. This mixture is rubbed into the surface of the block with a piece of buckskin or cloth, two or three thin coatings being applied, that the pores may be thoroughly filled, but no pellicle of varnish of appreciable thickness left upon the surface. An even, smooth, and polished surface is thus obtained upon which to take the photographic picture. Upon this surface the collodion is poured, as in the ordinary manner of taking photographic pictures. The silver bath is then applied—forty-five grains of nitrate of silver to one ounce of distilled water. The block is then exposed in the camera a sufficient length of time to take the picture, and it is then subjected to the "developing solution," which is compounded as follows: two and one-half ounces sulphate of iron, two and one-half ounces acetic acid, two quarts water, two and one-half ounces best alcohol. The picture is then fixed by the following "fixing solution": two and one-half ounces cyanuret of potassium, one quart water. The block is now to be washed in clear water and dried, when it is fit for the engraver.

I do not claim the use of asphaltum varnish and lamp-black, or of any other varnish or compound when used to produce a pellicle or covering upon surfaces designed for the reception of photographic pictures, as such varnish or pellicle unfits the block for the engraver's use; but What I do claim as my invention, and desire to secure by Letters Patent, is—

The above-described varnish, composed of asphaltum varnish, lamp-black, and ether, when the same is applied to the block by rubbing into its pores in the manner set forth.

ROBERT PRICE.

Witnesses:
THOS. R. ROACH,
P. E. TESCHEMACHER.